United States Patent
Sauvinet

(10) Patent No.: US 7,896,288 B2
(45) Date of Patent: Mar. 1, 2011

(54) METHOD FOR IMPROVING ROLL STEERING OF AN AIRCRAFT AND AIRCRAFT USING SAME

(75) Inventor: Frederic Sauvinet, Tournefeuille (FR)

(73) Assignee: Airbus France, Toulouse (FR)

( * ) Notice: Subject to any disclaimer, the term of this patent is extended or adjusted under 35 U.S.C. 154(b) by 903 days.

(21) Appl. No.: 11/720,818

(22) PCT Filed: Dec. 5, 2005

(86) PCT No.: PCT/FR2005/003026
§ 371 (c)(1),
(2), (4) Date: Jun. 4, 2007

(87) PCT Pub. No.: WO2006/064102
PCT Pub. Date: Jun. 22, 2006

(65) Prior Publication Data
US 2009/0250551 A1     Oct. 8, 2009

(30) Foreign Application Priority Data
Dec. 16, 2004  (FR) ..................... 04 13400

(51) Int. Cl.
*B64C 5/02* (2006.01)
(52) U.S. Cl. .................... 244/75.1; 244/87
(58) Field of Classification Search ........... 244/87, 244/75.1, 76 B, 225, 90 R, 99.11
See application file for complete search history.

(56) References Cited

U.S. PATENT DOCUMENTS

| | | | | |
|---|---|---|---|---|
| 2,120,065 A | * | 6/1938 | Rougé | 244/87 |
| 2,188,834 A | * | 1/1940 | Fischel et al. | 244/76 B |
| 2,363,550 A | * | 11/1944 | Reichert | 244/87 |
| 2,643,833 A | * | 6/1953 | Ambroise | 244/87 |
| 3,415,468 A | * | 12/1968 | Labombarde | 244/87 |
| 4,455,004 A | | 6/1984 | Whitaker et al. | |
| 6,241,183 B1 | * | 6/2001 | Mathieu | 244/99.11 |
| 6,641,086 B2 | * | 11/2003 | Clark | 244/99.11 |
| 6,863,242 B2 | * | 3/2005 | Van De Kreeke et al. | 244/7 R |
| 2004/0245387 A1 | | 12/2004 | Kreeke et al. | |

FOREIGN PATENT DOCUMENTS

| | | |
|---|---|---|
| EP | 0256374 | 2/1988 |
| FR | 2770824 | 5/1999 |
| FR | 2850084 | 7/2004 |

OTHER PUBLICATIONS

PCT International Search Report dated Apr. 28, 2006.

* cited by examiner

*Primary Examiner* — Galen Barefoot
(74) *Attorney, Agent, or Firm* — Dickinson Wright PLLC

(57) ABSTRACT

A roll steering method subdivides the direction of an aircraft control surface into two elements and, during a roll control operation using ailerons, steers an upper element of the control surface in the roll direction and a lower element in the opposite direction.

10 Claims, 3 Drawing Sheets

METHOD FOR IMPROVING ROLL STEERING OF AN AIRCRAFT AND AIRCRAFT USING SAME

FIELD OF THE INVENTION

The present invention relates to a method for improving the roll steering of an aircraft, as well as to an aircraft implementing this method.

BACKGROUND OF THE RELATED ART

It is known that the wings of an aircraft are provided with controllable aerodynamic surfaces—principally ailerons and subsidiarily spoiler flaps—making it possible to steer said aircraft roll-wise about its longitudinal axis. It is also known that, in particular for aircraft of large dimensions, said wings are flexible and deformable so that, in certain flight situations (high speed, high Mach number, high dynamic pressure), the deflection of said aerodynamic roll control surfaces results in the twisting of said wings, thereby causing the latter to take up a local angle of incidence opposing the aerodynamic roll effects of said aerodynamic surfaces and greatly reducing their effectiveness. The roll response of the aircraft does not therefore correspond to the roll instructed by said aerodynamic surfaces.

SUMMARY OF THE INVENTION

The object of the present invention is to remedy this drawback.

Accordingly, according to the invention, the method for improving the roll steering of an aircraft comprising:
  a fuselage,
  two wings, symmetric with respect to said fuselage, provided with controllable aerodynamic surfaces able to produce a roll movement for the aircraft, and
  a vertical fin projecting with respect to the rear part of said fuselage and provided with a rudder extending along the rear edge of said fin and able to turn, with respect to the latter, about an axis of rotation,
is noteworthy in that:
  said rudder is divided, transversely to said axis of rotation, into at least two rudder elements disposed successively along said axis of rotation and being independently controllable in rotation about the latter; and
  when said wing aerodynamic surfaces are deflected so as to communicate a roll movement to said aircraft in a determined direction:
    at least one of said rudder elements disposed on the side of the end of said vertical fin opposite to said fuselage is deflected in said determined direction of roll, and
    simultaneously, at least one of said rudder elements disposed on the side of the end of said vertical fin neighboring said fuselage is deflected in the opposite direction.

Thus, said rudder elements produce antagonistic lifting forces transverse to said aircraft, which exert on the latter roll moments, likewise antagonistic, with respect to the longitudinal axis of said aircraft. However, on account of the fact that the rudder elements which exert a roll moment in the same direction as the movement due to said aerodynamic surfaces of the wings are further from said axis than said rudder elements which exert a roll moment in the opposite direction, the resultant moment exerted roll-wise by said rudder elements therefore enhances the roll movement produced by said aerodynamic surfaces of the wings.

Preferably, the number, the surface area, the disposition, etc., of said rudder elements is chosen in such a way that the antagonistic yaw effects, produced by said rudder elements deflected in opposite directions, balance one another at least approximately, the resultant yaw effect being practically zero.

In an advantageous mode of implementation of the present invention, said rudder comprises just two rudder elements, namely a lower rudder element and an upper rudder element, and, during a roll movement produced by said aerodynamic surfaces of the wings, said upper rudder element is deflected in the direction of the roll movement and said lower rudder element is deflected in the opposite direction simultaneously. In this case, the surface areas of said lower and upper rudder elements are at least approximately equal and said lower and upper rudder elements are deflected symmetrically about said axis of rotation of the rudder. Thus, no yaw effect results therefrom.

Regardless of the number of said rudder elements, it is preferable for the extra roll control afforded by said rudder elements to take place only when the aircraft is in a flight situation in which said aerodynamic surfaces of the wings exhibit a loss of roll effectiveness. Generally, in such a situation, the speed, the Mach number or the dynamic pressure of the aircraft are very high. So, in order to determine such a situation, it is possible to measure at least one of the three quantities hereinabove in the guise of parameter and to compare the measurement of said parameter with a threshold, for example determined experimentally, beyond which said situation occurs. Thus, as long as the measurement of the parameter is below said threshold, the roll effectiveness of the aerodynamic surfaces of the wings is satisfactory and it is not necessary to involve the rudder elements. On the other hand, when the measurement of the parameter is above said threshold, the roll effectiveness of the aerodynamic surfaces of the wings is no longer satisfactory and the method according to the invention is implemented.

The present invention relates moreover to an aircraft implementing the above-described method of the invention. Such an aircraft, comprising:
  a fuselage;
  two wings, symmetric with respect to said fuselage, provided with controllable aerodynamic surfaces able to produce a roll movement for the aircraft;
  means of roll steering of said aircraft able to control said controllable aerodynamic surfaces;
  a vertical fin projecting with respect to the rear part of said fuselage and provided with a rudder extending along the rear edge of said fin and able to turn, with respect to the latter, about an axis of rotation; and
  means of yaw steering of said aircraft able to control said rudder,
is noteworthy in that:
  said rudder consists of at least two rudder elements disposed successively along said axis of rotation;
  said means of yaw steering are able to produce first individual deflection orders for each of said rudder elements;
  said means of roll steering are able to produce, in addition to deflection orders for said aerodynamic surfaces, second individual deflection orders for said rudder elements, said second deflection orders being such that the resultant yaw action is at least approximately zero; and
  means of addition are provided for adding, for each of said rudder elements, the second individual deflection order to the corresponding first individual deflection order, when the measurement of a parameter representative of a particular flight situation exceeds a preset threshold.

In a preferred embodiment, said rudder consists of a lower rudder element and of an upper rudder element.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
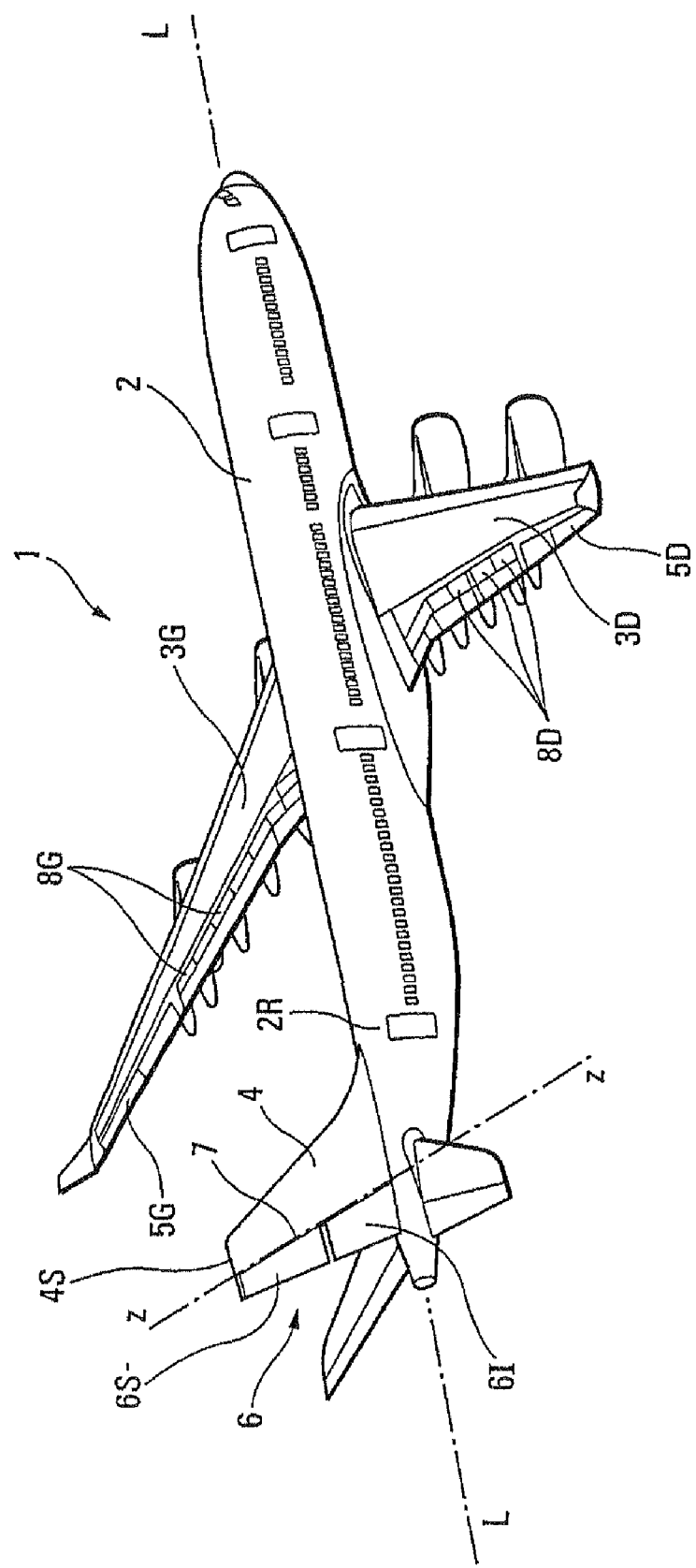
FIG. 1 is a perspective view, from above and from the rear, of a wide-bodied civil aircraft, whose rudder is, according to an exemplary implementation of the present invention, divided into an upper rudder element and into a lower rudder element.

The wide-bodied civil aircraft 1, shown in FIG. 1, comprises, in a known manner, a fuselage 2 exhibiting a longitudinal axis L-L and provided with two wings 3G and 3D symmetric with respect to said fuselage 2 as well as a vertical fin 4, projecting upwards with respect to the rear part 2R of the fuselage 2. Moreover, likewise in a known manner, on the one hand, said wings 3G and 3D are each provided with at least one aileron 5G or 5D, said ailerons 5G and 5D being symmetric with respect to the fuselage 2 and being able to produce a roll movement for the aircraft and, on the other hand, the vertical fin 4 is provided with a rudder 6 extending along the rear edge 7 of said fin 4 and being able to turn, with respect to the latter, about an axis of rotation z-z.

Moreover, said wings 3D and 3G are respectively provided with spoiler flaps 8D and 8G, pair-wise symmetric with respect to the fuselage 2, said spoiler flaps 8D and 8G being usable, in a known manner, for the roll control of the aircraft 1, to enhance the action of the ailerons 5D and 5G.

According to a first particular feature of the exemplary implementation of the present invention, represented in FIG. 1, said rudder 6 is divided, transversely to said axis of rotation z-z, into two rudder elements 6S and 6I, of aerodynamically equivalent service area, disposed one following the other, so that one, 6I, is near the rear part 2R of the fuselage 2 and occupies a lower position, while the other, 6S, is near the upper end 4S of the vertical fin 4, opposite from said rear part 2R, and therefore occupies an upper position.

The upper 6S and lower 6I rudder elements may be controlled jointly in rotation so that the rudder 6 behaves as if it were monolithic. The rudder elements 6S and 6I may also be controlled individually and, as the case may be, in opposite directions.

Figure 2:
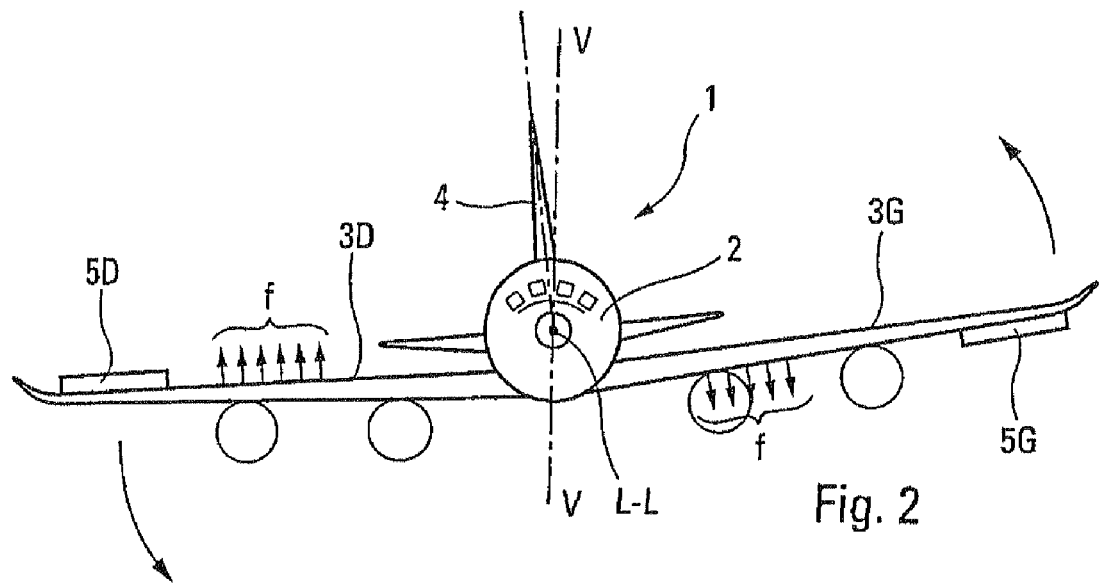
FIG. 2 is a diagrammatic view of the front of the aircraft of FIG. 1, illustrating the situation in which the roll is controlled by the ailerons alone of said aircraft.

When, as is illustrated in FIG. 2, a roll movement is controlled in a standard fashion with the assistance of said ailerons 5G and 5D (the action of which is optionally enhanced by the spoiler flaps 8G, 8D, not represented in FIG. 2), it may happen that in certain flight situations where the speed is high, the deflection of the ailerons 5G, 5D—and possibly of the spoiler flaps 8G, 8D—results in the twisting of the wings 3G, 3D with respect to their point of anchoring in the fuselage 2. This results in adoptions of local angle of incidence of said wings, symbolized by the arrows f in FIG. 2, opposing the aerodynamic effects of the ailerons 5G, 5D and, possibly, of the spoiler flaps 8G, 8D and greatly reducing the roll effectiveness of said ailerons 5G, 5D and spoiler flaps 8G, 8D. The aircraft 1 therefore no longer has a roll response tailored to the request of the pilot.

Figure 3:
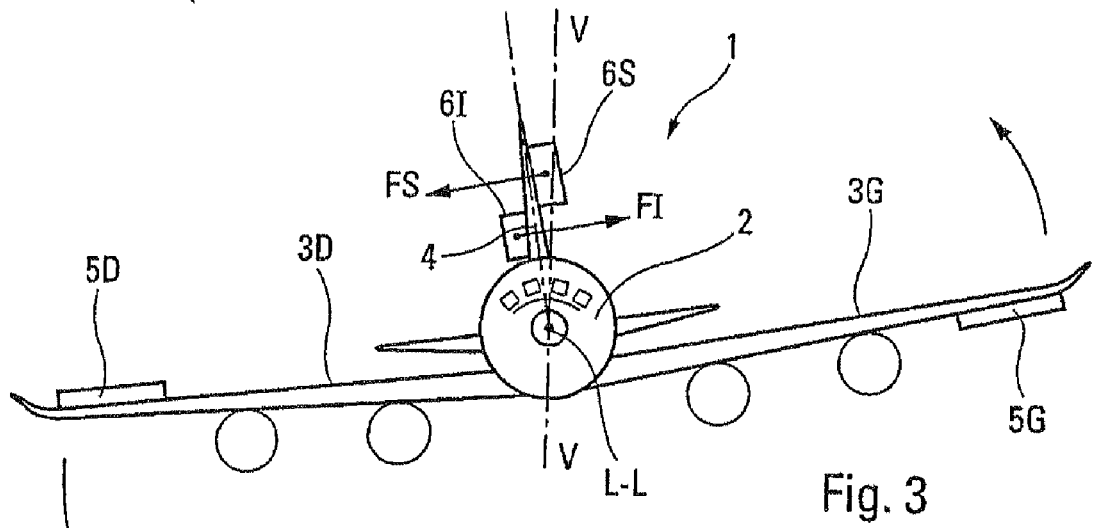
FIG. 3 is a diagrammatic view of the front of the aircraft of FIG. 1, comparable to FIG. 2, illustrating the implementation of the method in accordance with the present invention.
Figure 4:
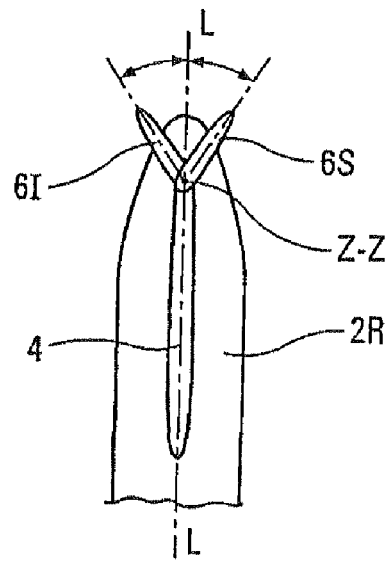
FIG. 4 is a diagrammatic view from above of the rear part of said aircraft, with the rudder elements in the configuration of FIG. 3.

To remedy this drawback, according to the invention, at the same time as the ailerons 5G, 5D (and possibly the spoiler flaps 8G, 8D) are deflected to obtain a roll movement of the aircraft 1 about the longitudinal axis L-L, the rudder elements 6S and 6I are deflected in a symmetric manner with respect to the fin 4 of the aircraft (see FIGS. 3 and 4), the upper rudder element 6S being deflected in the direction of the roll instructed, while the lower rudder element 6I is deflected in the opposite direction.

Under these conditions, the upper and lower rudder elements produce respectively lateral lifting forces FS and FI, of equal moduli, but of opposite directions. In their turn, these forces FS and FI respectively produce, and with respect to the longitudinal axis L-L of the aircraft 1, a moment in the direction of the roll movement instructed and a moment antagonistic to said roll movement. Since the lever arm of the force FS is larger than that of the force FI, the moment in the direction of roll is greater than the moment in the antagonistic direction and the resultant moment of these two moments therefore acts in the direction of the roll movement instructed.

Thus, the rudder elements 6S and 6I assist the ailerons 5G, 5D (and possibly the spoiler flaps 8G, 8D) in the achieving of said instructed roll movement.

Moreover, it will be noted that, since the rudder elements 6S and 6I exhibit almost identical surface areas and are deflected symmetrically with respect to the fin 4, their deflections do not cause any yaw effect.

Figure 5:
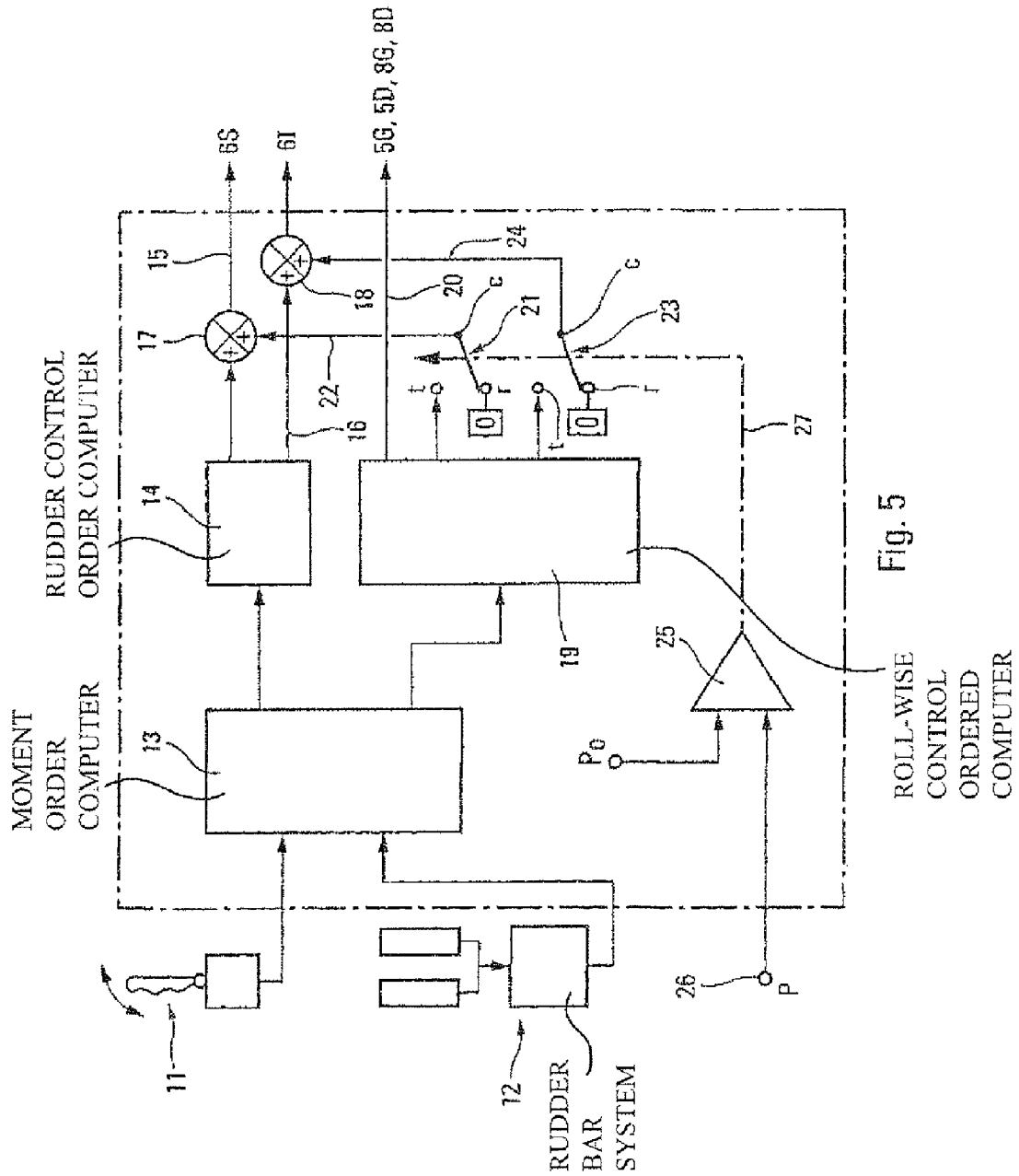
FIG. 5 shows the schematic diagram of a roll and yaw control device for the implementation of the method of the invention.

The device for the implementation of the method described above, represented diagrammatically in FIG. 5, comprises:

a stick system 11, able to produce, among other things, roll control orders for the ailerons 5G, 5D and, possibly, for the spoiler flaps 8G, 8D;

a rudder bar system 12, able to produce control orders for the rudder elements 6S and 6I;

a computer 13 receiving said control orders originating from the stick system 11 and from the rudder bar system 12 and delivering, to its outputs and as a function of the electric flight control laws that it possesses in memory, respectively, a moment order instructed yaw-wise and a moment order instructed roll-wise;

a computer 14 receiving from said computer 13 the yaw-wise instructed moment order and formulating respective control orders for the rudder elements 6S and 6I, which orders are addressed to the actuators of the latter, respectively by lines 15 and 16;

an adder 17 interposed on the control line 15 for the upper rudder element 6S;

an adder 18 interposed on the control line 16 for the lower rudder element 6I;

a computer 19 receiving from said computer 13 the roll-wise instructed moment order and formulating respective roll-wise control orders:

for the ailerons 5G, 5D and possibly for the spoiler flaps 8G, 8D, said corresponding orders being addressed to the actuators of the latter by a line 20, for the upper rudder element 6S, said corresponding orders being available on the working contact of a switch 21, whose resting contact r is connected to a zero potential and whose common contact c is connected to the adder 17 by a line 22, and for the lower rudder element 6I, said corresponding orders being available on the working contact of a switch 23, whose resting contact r is connected to a zero potential and whose common contact c is connected to the adder 18 by a line 24; and a comparator 25 receiving, from a terminal 26, the measurement of a parameter P, such as the speed of the aircraft, the Mach number, the dynamic pressure, etc., and comparing this measurement with a preset threshold Po representative of a flight situation beyond which the roll control by the ailerons 5G, 5D assisted possibly by the spoiler flaps 8G, 8D, is no longer satisfactory, said comparator 25 being able to control said switches 21 and 23 by an action line 27.

Thus, when the aircraft 1 is not in a flight situation for which the roll action of the ailerons 5G, 5D (and possibly that of the spoiler flaps 8G, 8D) is lessened, the rudder elements 6S and 6I are controlled by the rudder bar system 12, through the computers 13 and 14 and the lines 15 and 16.

On the other hand, when such a situation occurs, it is detected by the measurement of the parameter P which becomes greater than the threshold Po and the comparator 25 toggles the switches 21 and 23, from their resting positions r to their working positions t, so that the roll orders formulated by the computer 19 respectively for the upper rudder element 6S and for the lower rudder element 6I are transmitted to the adders 17 and 18, respectively by the lines 22 and 24. In this case, the orders addressed to the rudder elements 6S and 6I comprise, on the one hand, yaw orders instructed by the rudder bar system 12 and, on the other hand, roll-assist orders originating from the computer 14.

The invention claimed is:

1. A method for improving the roll steering of an aircraft of large dimensions comprising:
   a fuselage,
   two wings symmetric with respect to said fuselage, provided with controllable aerodynamic surfaces configured to produce a roll movement for the aircraft, and
   a vertical fin projecting upwards with respect to the rear part of said fuselage and provided with a rudder extending along the rear edge of said fin and configured to turn, with respect to said vertical fin, about an axis of rotation,
   said method comprising:
   dividing said rudder, transversely to said axis of rotation, into at least two individual rudder elements disposed successively along said axis of rotation and being independently controllable in rotation about said axis of rotation, and
   when said wing aerodynamic surfaces are deflected so as to communicate a roll movement to said aircraft in a determined direction:
     deflecting at least one of said individual rudder elements disposed farther from said fuselage in said determined direction of roll, and
     simultaneously, deflecting at least one of said individual rudder elements disposed nearer to said fuselage in the opposite direction.

2. The method as claimed in claim 1, wherein the antagonistic yaw effects produced by the rudder elements deflected in opposite directions balance one another at least approximately.

3. The method as claimed in claim 1, wherein:
   said rudder is divided into a lower rudder element and into an upper rudder element; and
   during a roll movement produced by said aerodynamic surfaces of the wings, said upper rudder element is deflected in the direction of said roll movement and said lower rudder element is deflected in the opposite direction simultaneously.

4. The method as claimed in claim 3, wherein the surface areas of said lower and upper rudder elements are at least approximately equal and said lower and upper rudder elements are deflected symmetrically about said axis of rotation of said rudder.

5. The method as claimed in claim 1, wherein the deflection of said rudder elements is subject to the exceeding of a threshold by a parameter representative of a particular flight situation of said aircraft.

6. The method as claimed in claim 5, wherein said parameter is the speed of the aircraft.

7. The method as claimed in claim 5, wherein said parameter is the Mach number.

8. The method as claimed in claim 5, wherein said parameter is the dynamic pressure.

9. An aircraft with improved roll control implementing the method specified under claim 2, comprising:
   a fuselage;
   two wings, symmetric with respect to said fuselage, provided with controllable aerodynamic surfaces configured to produce a roll movement for the aircraft;
   a roll steering unit that roll steers said aircraft operable to control said controllable aerodynamic surfaces;
   a vertical fin projecting with respect to the rear part of said fuselage and provided with a rudder extending along the rear edge of said fin and configured to turn, with respect to the latter, about an axis of rotation; and
   a yaw steering unit that yaw steers said aircraft operable to control said rudder,
   wherein:
   said rudder comprises at least two rudder elements disposed successively along said axis of rotation;
   said yaw steering unit is configured to produce first individual deflection orders for each of said rudder elements;
   said roll steering unit is configured to produce, in addition to deflection orders for said aerodynamic surfaces, second individual deflection orders for said rudder elements, said second deflection orders being such that the resultant yaw action is at least approximately zero; and
   an addition unit is provided for adding, for each of said rudder elements, the second individual deflection order to the corresponding first individual deflection order when the measurement of a parameter representative of a particular flight situation exceeds a preset threshold.

10. The aircraft as claimed in claim 9, wherein said rudder comprises a lower rudder element and an upper rudder element.

* * * * *